United States Patent
Valecha et al.

(10) Patent No.: US 12,463,958 B2
(45) Date of Patent: Nov. 4, 2025

(54) REMOTE AUTHENTICATION PROCESSING FOR A LOCAL USER DEVICE

(71) Applicant: International Business Machines Corporation, Armonk, NY (US)

(72) Inventors: Vinod Anandram Valecha, Pune (IN); Rinkesh I. Bansal, Pune (IN); Sanjay B. Panchal, Mumbai (IN); Chintan Thaker, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1022 days.

(21) Appl. No.: 17/470,497

(22) Filed: Sep. 9, 2021

(65) Prior Publication Data
US 2023/0072072 A1 Mar. 9, 2023

(51) Int. Cl.
*G06F 7/04* (2006.01)
*H04L 9/40* (2022.01)

(52) U.S. Cl.
CPC ........ *H04L 63/083* (2013.01); *H04L 63/0272* (2013.01); *H04L 63/0876* (2013.01); *H04L 63/20* (2013.01)

(58) Field of Classification Search
CPC ..... G06F 21/44; H04L 63/0884; H04L 63/10; H04L 63/0272; H04L 63/083; H04L 63/0876; H04L 63/20
See application file for complete search history.

(56) References Cited

U.S. PATENT DOCUMENTS 8,112,790 B2 * 2/2012 Grosse ............... H04L 63/0884
  713/168
8,340,292 B1 * 12/2012 Schnellbacher ...... H04L 63/306
  726/4

(Continued)

FOREIGN PATENT DOCUMENTS

| CN | 111034118 A | 4/2020 |
| JP | 2011133948 A | 7/2011 |
| WO | 2023/036077 A1 | 3/2023 |

OTHER PUBLICATIONS

Vassilev et al, Personal Brokerage of Web Service Access, Oct. 31, 2007, IEEE, pp. 24-31. (Year: 2007).*

(Continued)

*Primary Examiner* — Philip J Chea
*Assistant Examiner* — Jenise E Jackson
(74) *Attorney, Agent, or Firm* — Garg Law Firm, PLLC; Rakesh Garg; Michael O'Keefe

(57) ABSTRACT

An embodiment intercepts an authentication request being sent from a secure web service to a user device associated with a user. The embodiment transmits, responsive to the authentication request, a credential request to a credential storage, wherein the credential request includes a request for a credential associated with the user and the secure web service. The embodiment receives, responsive to the credential request, the credential associated with the user and the secure web service. The embodiment transmits, as a response to the authentication request, the credential associated with the user to the secure web service. The embodiment intercepts, responsive to successful validation of the credential by the secure web service, an authentication response from the secure web service, where the authentication response includes session data required for maintaining an authenticated session with the secure web service.

(Continued)

The embodiment forwards the authentication response with the session data to the user device.

17 Claims, 13 Drawing Sheets

(56) References Cited

U.S. PATENT DOCUMENTS

| | | | | |
|---|---|---|---|---|
| 8,776,209 | B1* | 7/2014 | Kumar | H04L 63/0815 |
| | | | | 709/225 |
| 8,782,741 | B1* | 7/2014 | L'Heureux | H04L 67/306 |
| | | | | 726/3 |
| 9,483,627 | B1* | 11/2016 | Ferg | H04L 63/083 |
| 10,313,881 | B2 | 6/2019 | Liu | |
| 10,469,362 | B1* | 11/2019 | Burns | H04L 47/12 |
| 10,511,575 | B2 | 12/2019 | Gigov et al. | |
| 11,552,936 | B2* | 1/2023 | Call | H04L 63/0846 |
| 2004/0193921 | A1* | 9/2004 | Byrne | G06F 21/41 |
| | | | | 709/229 |
| 2005/0081044 | A1 | 4/2005 | Giles et al. | |
| 2006/0029064 | A1* | 2/2006 | Rao | H04L 61/2557 |
| | | | | 370/389 |
| 2007/0300306 | A1* | 12/2007 | Hussain | G06F 21/6227 |
| | | | | 726/27 |
| 2012/0167162 | A1* | 6/2012 | Raleigh | H04W 12/069 |
| | | | | 726/1 |
| 2014/0282919 | A1 | 9/2014 | Mason | |
| 2014/0289830 | A1 | 9/2014 | Lemaster et al. | |
| 2015/0121481 | A1* | 4/2015 | Venkatanaranappa | |
| | | | | H04L 63/0815 |
| | | | | 726/5 |
| 2017/0012949 | A1 | 1/2017 | Boren et al. | |
| 2017/0310445 | A1 | 10/2017 | Kalligudd | |
| 2017/0317981 | A1* | 11/2017 | Klein | H04L 63/0281 |
| 2018/0212930 | A1* | 7/2018 | Cammisa | H04L 63/0281 |
| 2018/0322298 | A1 | 11/2018 | Momchilov et al. | |
| 2019/0372847 | A1* | 12/2019 | Huh | H04L 63/10 |
| 2020/0128002 | A1* | 4/2020 | Khanna | H04L 9/3228 |
| 2020/0169460 | A1* | 5/2020 | Bartlett | H04W 12/50 |
| 2020/0267147 | A1* | 8/2020 | Moreno | H04L 61/2503 |
| 2021/0044976 | A1 | 2/2021 | Avetisov et al. | |
| 2025/0077638 | A1* | 3/2025 | Chopra | G06F 21/44 |

OTHER PUBLICATIONS

Zhang et al, Integrated Security Framework for Secure Web Services, Apr. 4, 2010, IEEE, pp. 178-183. (Year: 2010).*

International Searching Authority, PCT/CN2022/117015, Nov. 25, 2022.

* cited by examiner

REMOTE AUTHENTICATION PROCESSING FOR A LOCAL USER DEVICE

BACKGROUND

The present invention generally relates to security techniques applicable to client/server systems. More particularly, the present invention relates to a method, system, and computer program product for remote authentication processing for a local user device.

Users who engage in online services, such as online banking or commerce, typically must establish credentials for accounts at each service. The credentials allow the user to be authenticated by a service to prevent unauthorized use of the user's account. A common form of authentication involves the use of username and password credentials. Ideally, the user maintains these credentials in secrecy to prevent an unauthorized user from discovering them and using them to gain access to one of the user's online accounts. Nevertheless, if the user's credentials are discovered, the associated account is at risk of being exploited by an unauthorized user.

To mitigate this risk, some authentication techniques require additional or alternative forms of credentials selected to make it more difficult for unauthorized users to gain access to user accounts. For example, two-factor or multi-factor authentication requires a user to input credentials, such as a username and password, followed by a secondary authentication mechanism. An example of a secondary authentication mechanism involves the user providing a dynamic code or password that was sent to the user through an out-of-band mechanism, such as a code sent to the user mobile device via text message or automated phone call. Another example of a secondary authentication mechanism involves confirming some physical characteristic of the user, known as biometrics, such as fingerprint or iris recognition.

SUMMARY

The illustrative embodiments provide for remote authentication processing for a local user device. An embodiment includes intercepting an authentication request being sent from a secure web service to a user device associated with a user. The embodiment also includes transmitting, responsive to the authentication request, a credential request to a credential storage, where the credential request includes a request for a credential associated with the user and the secure web service. The embodiment also includes receiving, responsive to the credential request, the credential associated with the user and the secure web service. The embodiment also includes transmitting, as a response to the authentication request, the credential associated with the user to the secure web service. The embodiment also includes intercepting, responsive to successful validation of the credential by the secure web service, an authentication response from the secure web service, where the authentication response includes session data required for maintaining an authenticated session with the secure web service. The embodiment also includes forwarding the authentication response with the session data to the user device. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
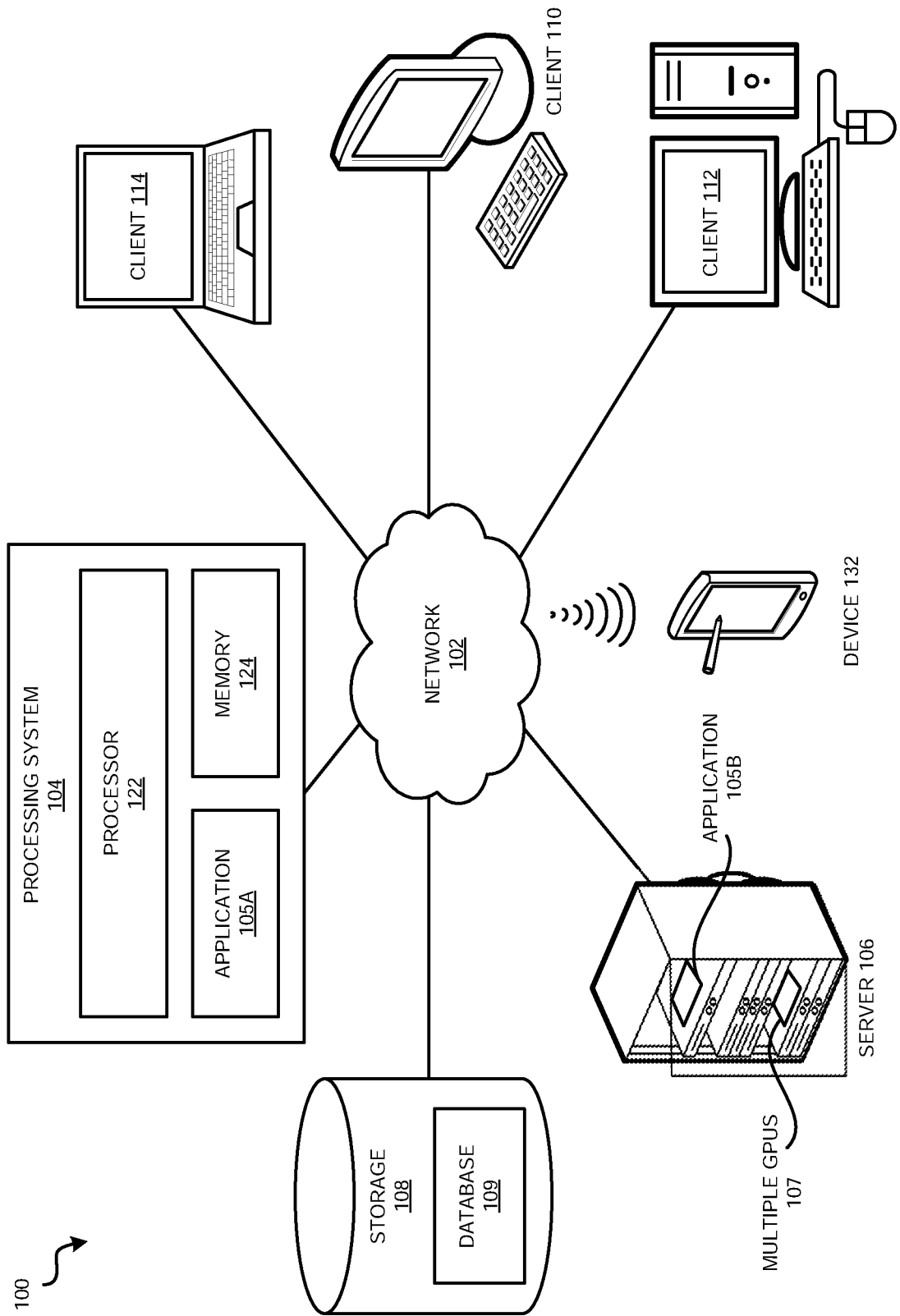
FIG. 1 depicts a block diagram of a network of data processing systems in which illustrative embodiments may be implemented.

Many people and businesses now engage in a growing number of online activities, such as banking, commerce, and social media, that involve sensitive information. Because of this, a user typically must establish credentials with an online service that will allow the service to validate the identity of the user to protect the user's sensitive information. During subsequent visits to the online service, an online authentication process typically begins with a screen prompt asking the user to input their credentials, such as a username and password. A website or application (also referred to as a web service or secure web service herein) then verifies the user input against information obtained during the user registration with the service.

Despite its popular use, this authentication process in which the user transmits credentials to a web service is susceptible to several vulnerabilities. Numerous technological approaches have been attempted in addressing the challenges associated with protecting online user accounts. For example, many web services encourage or require users to create increasingly long and complex passwords that are difficult to guess. However, such passwords are also more difficult to remember. As a result, some users choose to write down passwords and relevant account information on paper or save them in unencrypted computer files or emails, which inevitably leads to tarnished security and bad user experience leading to the inconvenience of resetting forgotten passwords or maintaining password lists where they may be discovered and exploited.

Other technological approaches to improving online security have included the introduction of multi-factor authentications. For example, some web services include a process of sending a one-time password to the user via email or SMS text messaging during the authentication process. The process requires the user to provide this one-time password to gain access to their online account. However, such processes add undesirable time and inconvenience and may prevent the user from gaining access to their own accounts, for example if the user has misplaced their phone or is unable to gain access to their email.

The present disclosure recognizes that past approaches to solving this technological problem have failed to address a fundamental vulnerability in the traditional authentication process. That is, many of the techniques for gaining unauthorized possession of another user's login credentials depend on the credentials being in the user's possession, being input by the user into a user device, and/or being transmitted from the user device to the secure web service. Embodiments of the present disclosure eliminate each of the past requirements from an authentication process, and thereby significantly improve the security of an authentication process as numerous past exploits are rendered ineffective.

In an illustrative embodiment, an intermediary device having a remote authentication application is provided on a network topologically between a user device and a secure web service. The application performs at least a portion of an authentication process when the user requests access to the service. This eliminates the need for the user to input a credential to the user device and eliminates the past need for the user device to transmit the credential over a wired or wireless network. As a result, past exploits that rely on such things as monitoring the use of the user device or network traffic being sent from the user device are rendered ineffective.

In some embodiments, the application is provided on an intermediary device that is a new type of network device that includes capabilities described herein for providing remote authentication processing. Alternatively, embodiments of the intermediary device include a modified version of an existing network device, e.g., an existing network device that has been modified to include a remote authentication application as described herein. Non-limiting examples of such intermediary devices include Wi-Fi routers, mobile hotspots, routers, switches, VPN gateways and other devices that work at network or transport layers that include capabilities described herein for providing remote authentication processing. The intermediary device may be a device that the user, the user's business, or the user's employer owns and maintains. The intermediary device may alternatively be a device that is owned by a third party that offers services that include processes described herein.

In some embodiments, prior to performing processes described herein, the user will typically have performed a set-up or registration process for the remote authentication application. During the set-up or registration process, the user will provide the remote authentication application with credentials for one or more of the user's accounts with one or more web services. Embodiments of the credentials include information such as usernames, passwords, pin numbers, tokens, certificates, or any other form of credentials used to authenticate to secure web services. The credentials will typically also include information associating the credentials with respective web services, such as a URL or IP address. The credentials may also include additional information about the user, such as the user's name and email address. The credentials may also include identifying information about the web services, such as a name and category of the service. The user may provide credentials in many different ways. For example, the user may manually input the credentials to the remote authentication application, which in turn will store them in local or remote memory as credential storage. As another example, the user may already have a database of credentials and may either import them to the remote authentication application, which in turn will store them in local or remote memory as credential storage. The user may alternatively grant the remote authentication application access to the existing credentials database, which the remote authentication application will thereafter use as credentials storage.

In an illustrative embodiment, a process for remote authentication performed by the remote authentication application on an intermediary device is initiated during the initial stages of an authentication process. For example, a user seeking to access a secure web service will initiate access to the service by transmitting a page request to the web server. For example, the user device may initiate the connection in response to a user inputting a URL associated with the secure web service in a web browser on the user device. The web server responds by issuing an authentication request addressed to the user device. The remote authentication application monitors incoming network communications directed to the user device to detect credential requests. When the remote authentication application detects a credential request, it responds on behalf of the user device by retrieving the requested credential and transmitting it to the web service. This allows the user device to be authenticated to the web service without the need for the user to input a credential and without the need for the user device to transmit the credential. associated with the web service that issued the credential request.

In some embodiments, the remote authentication application detects and intercepts authentication requests directed to one or more registered users in order to perform the authentication process on behalf of the users' devices. For example, in some embodiments, the remote authentication application process monitors IP packets and performs pattern matching on the packet headers. In some such embodiments, the remote authentication application detects an authentication request to a user by detecting a header information that includes a destination address that matches the user device and includes an HTTP 401 unauthorized status line and a WWW-Authenticate header field.

In some embodiments, upon detecting an authentication request, the remote authentication application transmits, responsive to the authentication request, a credential request to a credential storage. In some embodiments, the credential request includes a request for a credential associated with the user and the secure web service. The credential storage locates the requested credentials in response to the request and transmits the credentials to the credential request module.

In some embodiments, the remote authentication application receives, responsive to the credential request, the credential associated with the user and the secure web service from the credential storage. The remote authentication application then transmits, as a response to the authentication request, the credential associated with the user to the secure web service.

In some embodiments, the remote authentication application intercepts, responsive to successful validation of the credential by the secure web service, an authentication response from the secure web service. In some such embodiments, the authentication response includes session data required for the user device to be able to maintain an authenticated session with the secure web service. In some embodiments, the remote authentication application intercepts the authentication response by monitoring network traffic addressed to the user device for a response from the secure web service to the credential submission. In some embodiments, the secure web service validates the credentials and transmits session data in an authentication response addressed to the user device in order to establish an authenticated session for the user with the secure web service. In some embodiments, the authentication response detection module monitors network traffic directed to the user device and performs pattern matching on response headers, for example to detect an HTTP 200 OK response with a Set-Cookie header.

In some embodiments, the remote authentication application forwards the authentication response with the session data to the user device. In some such embodiments, from that point forward, the user device may use the session data to maintain an authenticated session with the secure web service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
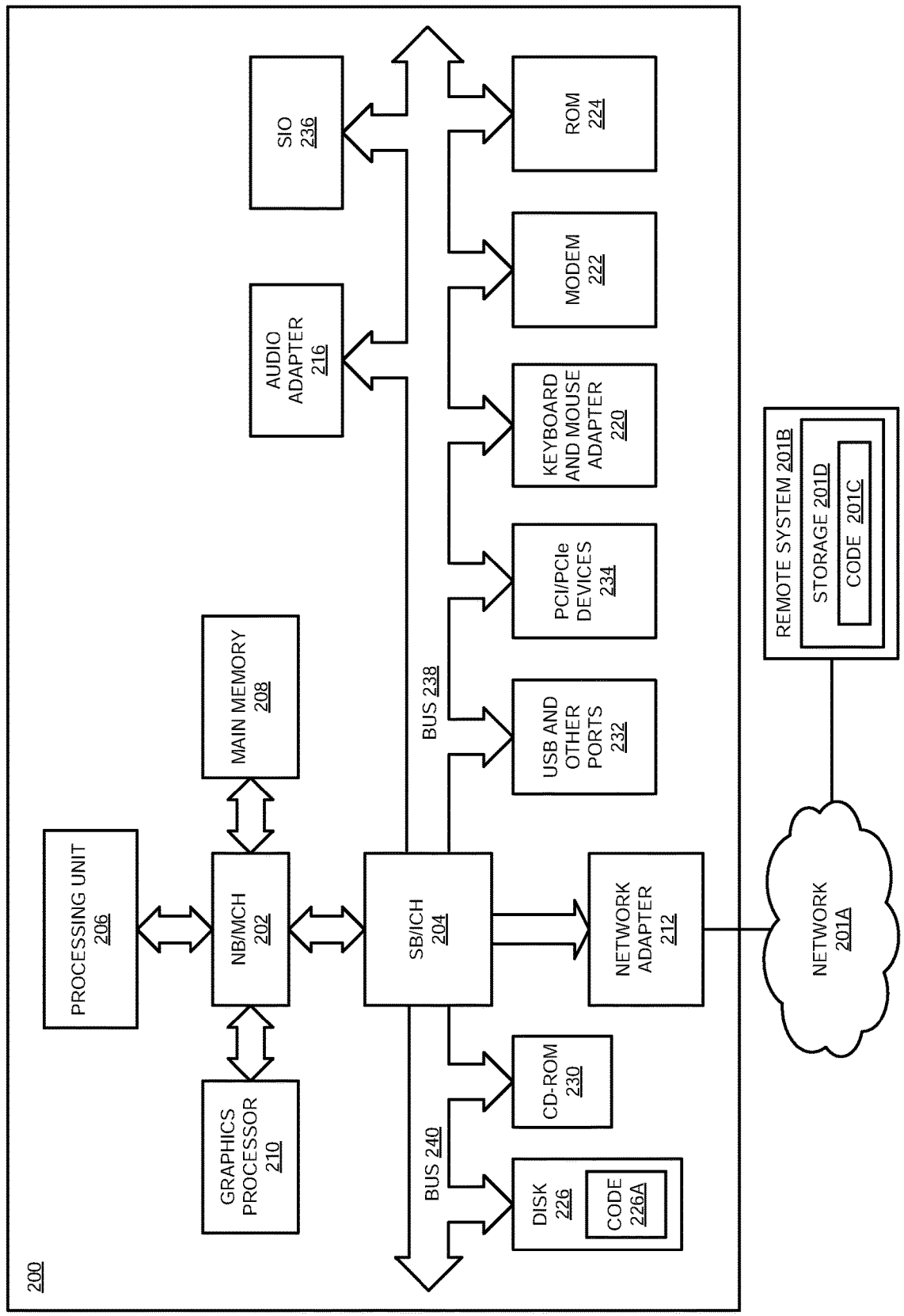
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment of a data center and a robot control platform for a data center. For example, server 106, and clients 110, 112, 114, are depicted as servers and clients only as example and not to imply a limitation to a client-server architecture. As another example, an embodiment of a robot control platform for a data center can be distributed across several data processing systems, and a data network as shown, whereas another embodiment of a robot control platform for a data center can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein of a robot control platform for a data center. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto.

Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
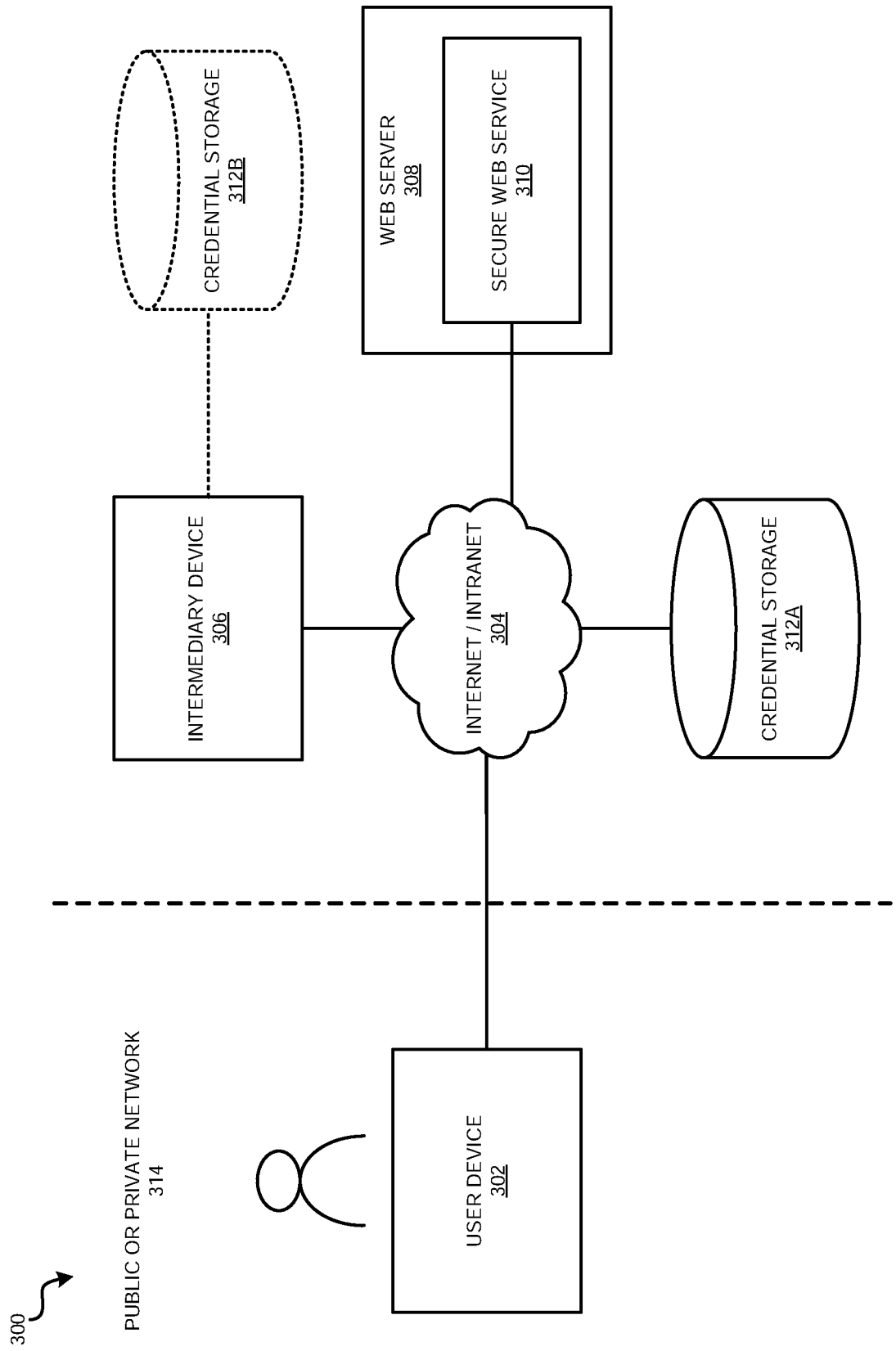
FIG. 3 depicts a block diagram of an example network environment in accordance with an illustrative embodiment.

With reference to FIG. 3, this figure depicts a block diagram of an example network environment 300 in accordance with an illustrative embodiment. The example embodiment includes an intermediary device 306 for providing remote authentication processing for a local user device 302. In a particular embodiment, intermediary device 306 is an example of processing system 104 or server 106 of FIG. 1, in which applications 105A or 105B, respectively, provide remote authentication processing for remote authentication for a local user device, such as device 132 or clients 110, 112, and/or 114 of FIG. 1.

In the illustrated embodiment, the network environment 300 comprises a user device 302 (also generally referred to as local user device 302) in communication with an intermediary device 306 via a network 304, which may include an intranet and/or the Internet. The user device 302 is also in communication with a secure web service 310 hosted on a web server 308 via the network 304. In some embodiments, the user device 302 communicates with the web server 308 via the intermediary device 306.

Although FIG. 3 shows the user device 302 on a public or private network 314 and a network 304 between the user device 302 and the web server 308, the user device 302 and the web server 308 may be on the same network. In some embodiments, the networks 304 and 314 are the same type of network, while in alternative embodiments the networks 304 and 314 are different types of networks. In some embodiments, the network 304 and/or the network 314 include a local-area network (LAN), such as a company Intranet, a metropolitan area network (MAN), or a wide area network (WAN), such as the Internet or the World Wide Web. In some embodiments, the network 314 is a private network and the network 304 is a public network. In some embodiments, the networks 304 and 314 are both be private networks. As an example, in some embodiments, the user device 302 is located at a branch office of a corporate enterprise communicating via a WAN connection over the network 314 to the web server 308 located at a corporate data center.

In the illustrated embodiment, the intermediary device 306 is connected to the network 304 and is geographically and topologically remote from the user device 302, for example in a remote data center. In alternative embodiments, the intermediary device 306 serves as an interface or gateway between the networks 304 and 314.

In the illustrated embodiment, the intermediary device 306 is also connected credential storage 312A, which is geographically and topologically remote from the intermediary device 306. For example, in some embodiments, the credential storage 312A is stored on a database server located in the same data center as the intermediary device or in a different data center. In some embodiments, the intermediary device 306 is local to the user device 302, e.g., connected to network 314, and the credential storage 312A is hosted at a remote data center or corporate server farm.

In alternative embodiments, the intermediary device 306 is instead connected to local credential storage 312B, which is topologically, and possibly also geographically, local to the intermediary device 306. For example, in some embodiments, the credential storage 312B is stored on a database server on a same LAN or WAN as the intermediary device 306, but is geographically distant (e.g., located in a different state, province, territory, or country). In alternative embodiments, the credential storage 312B is stored on a database server on a same LAN or WAN as the intermediary device 306, and is geographically local (e.g., located in a same data center, office, city, etc.). In other alternative embodiments, the credential storage 312B is stored in memory on the intermediary device 306.

In the illustrated embodiment, the user device 302 communicates with a secure web service 310 using an authenticated session. The secure web service 310 requires the user device 302 to provide credentials that verify the identity of the user before establishing the authenticated session. In various embodiments, the secure web service 310 is any type of web service that requires a user to provide login credentials. Non-limiting examples include web-based email accounts, online banking services, social media accounts, or a home or business computer configured to allow for remote access.

In some embodiments, a user accesses the secure web service 310 using the user device 302. For example, in some embodiments, the user launches a web browser on the user device 302 and enters a URL associated with the secure web service 310. This causes the user device 302 to establish an initial connection with the web server 308, for example using a TCP 3-way handshake process.

In order to allow the user to gain access to the secure elements of the secure web service 310, the web server 308 issues an authentication request addressed to the user device 302. The intermediary device 306 detects and intercepts the authentication request in order to perform the authentication process on behalf of the user device 302. The intermediary device 306 transmits a credential request to the credential storage 312A or 312B. In some embodiments, the credential request includes a request for a credential associated with the user and the secure web service 310. The credential storage 312A or 312B locates the requested credentials in response to the request and transmits the credentials to the intermediary device 306. Upon receiving the credentials from the credential storage 312A or 312B, the intermediary device 306 transmits a response to the authentication request with the user's credentials received from the credential storage 312A or 312B.

The secure web service 310 validates the credentials and transmits an authentication response addressed to the user device 302 in order to establish an authenticated session for the user with the secure web service 310. This time, the intermediary device 306 propagates the authentication response to the user device 302. The secure web service 310 may use any of a variety of known techniques for establishing an authenticated session with the user device 302. As a non-limiting example, the secure web service 310 may include session data, such as a certificate, token, or cookie, with the authentication response. The session data may then be used by the user device 302 to maintain an authenticated session with the secure web service 310.

FIGS. 4-10 depict exemplary embodiments of network environments that include an intermediary device that provides remote authentication processing for a local user device. The exemplary embodiments shown in FIGS. 4-10 are provided as non-limiting examples and those skilled in the art will appreciate that many additional network environment arrangements are possible for use in connection with processes described herein.

Figure 4:
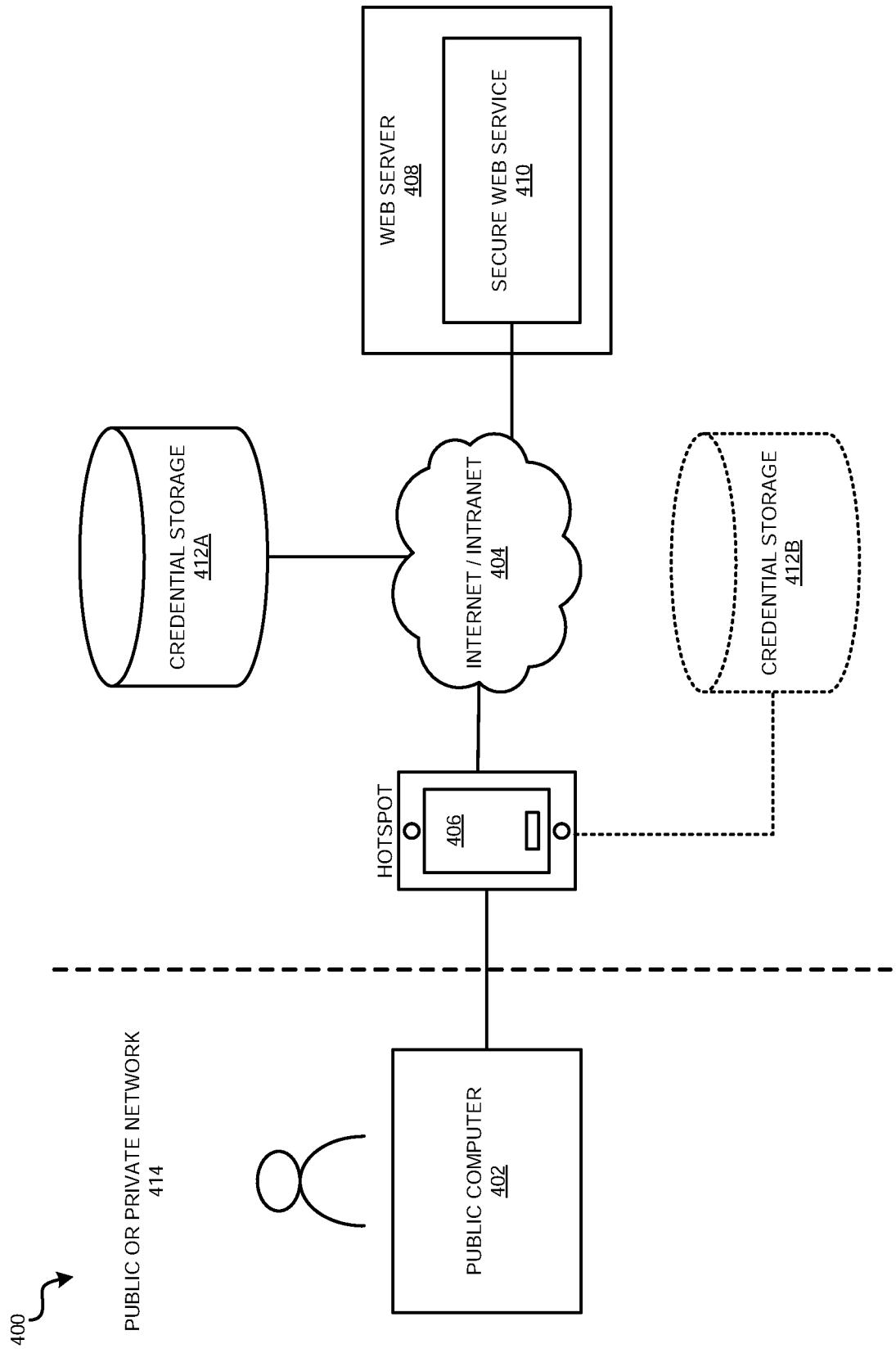
FIG. 4 depicts a block diagram of an example network environment that includes a hotspot device as an intermediary device in accordance with an illustrative embodiment.

With reference to FIG. 4, this figure depicts a block diagram of an example network environment 400 that includes a hotspot device as an intermediary device in accordance with an illustrative embodiment. The example embodiment of FIG. 4 includes a hotspot device 406 as an example of the intermediary device 306 of FIG. 3 and a public computer 402 as an example of the user device 302 of FIG. 3. This embodiment also includes networks 404 and 414 as examples of networks 304 and 314, respectively, of FIG. 3, credential storages 412A and 412B as examples of credential storages 314A and 314B, respectively, of FIG. 3, web server 408 as an example of web server 308 of FIG. 3, and secure web service 410 as an example of secure web server 310 of FIG. 3.

In the illustrated embodiment, the public computer 402 is representative of a computing device that the user shares with other users. For example, the public computer 402 may be a computer that is available for public use, for example at a library, hotel, or Internet café. As another example, the public computer 402 may be a laptop computer that is temporarily issued to different employees, for example for travel purposes, or a desktop computer that is shared by multiple employees, for example in a lab, in a break area, or for employees working different hours.

In the illustrated embodiment, the hotspot device 406 is a wireless access point that provides network access via a short-range wireless connection, such as Bluetooth, 802.11, and/or wireless local area network (WLAN) technology. In particular, the hotspot device 406 provides wireless network access to the public computer 402. In some embodiments, the hotspot device 406 is a dedicated hotspot device, a mobile telephone with hotspot functionality, or any other computing device having hotspot functionality. In some embodiments, the hotspot 406 connects the public computer 402 to the network 404 using cellular communications (e.g., 3G, 4G, GSM, CDMA, 5G, etc.).

In some embodiments, the hotspot device 406 is a personal hotspot owned or otherwise associated with the user operating the public computer 402. In some such embodiments, the hotspot device 406 is connected to the credential storage 412A, which is geographically and topologically remote from the hotspot device 406. For example, in some embodiments, the credential storage 412A is hosted at a remote data center or corporate server farm.

In alternative embodiments, the hotspot device 406 is instead connected to local credential storage 412B, which is topologically, and possibly also geographically, local to the hotspot device 406. For example, in some embodiments, the credential storage 412B is stored on a database server on a same LAN or WAN as the hotspot device 406, but is geographically distant (e.g., located in a different state, province, territory, or country). In alternative embodiments, the credential storage 412B is stored on a database server on a same LAN or WAN as the hotspot device 406, and is geographically local (e.g., located in a same data center, office, city, etc.) to the hotspot device 406. In other alternative embodiments, the credential storage 412B is stored in memory on the hotspot device 406.

In the illustrated embodiment, the public computer 402 and the wireless connection between the public computer 402 and the hotspot device 406 are vulnerable points in the communications link between the user and the secure web service 410. For example, the public computer 402 may have been compromised such that the user's activity on the public computer 402 is available to an unauthorized third party. This represents a risk to the user if the user inputs login credentials to the public computer 402 in order to establish an authenticated session with the secure web service 410.

In the illustrated embodiment, the hotspot device 406 obviates that risk by providing remote authentication processing on behalf of the user in place of the public computer 402. When the user initiates a connection to the secure web service 410, for example by entering a URL associated with the secure web service 410 in a web browser on the public computer 402, the public computer 402 attempts to establish an initial connection with the web server 408, for example using a TCP 3-way handshake process.

In order to allow the user to gain access to the secure elements of the secure web service 410, the web server 408 issues an authentication request addressed to the public computer 402. The hotspot device 406 detects and intercepts the authentication request in order to perform the authentication process on behalf of the public computer 402. The hotspot device 406 transmits a credential request to the credential storage 412A or 412B. In some embodiments, the credential request includes a request for a credential associated with the user and the secure web service 410. The credential storage 412A or 412B locates the requested credentials in response to the request and transmits the credentials to the hotspot device 406. Upon receiving the credentials from the credential storage 412A or 412B, the hotspot device 406 transmits a response to the authentication request with the user's credentials received from the credential storage 412A or 412B. The secure web service 410 validates the credentials and transmits an authentication response addressed to the public computer 402 in order to establish an authenticated session for the user with the secure web service 410. This time, the hotspot device 406 propagates the authentication response to the public computer 402. Thus, the user is able to establish an authenticated session with the secure web service 410 without needing to input or transmit sensitive login credentials using the public computer 402 or the wireless connection between the public computer 402 and the hotspot device 406.

Figure 5:
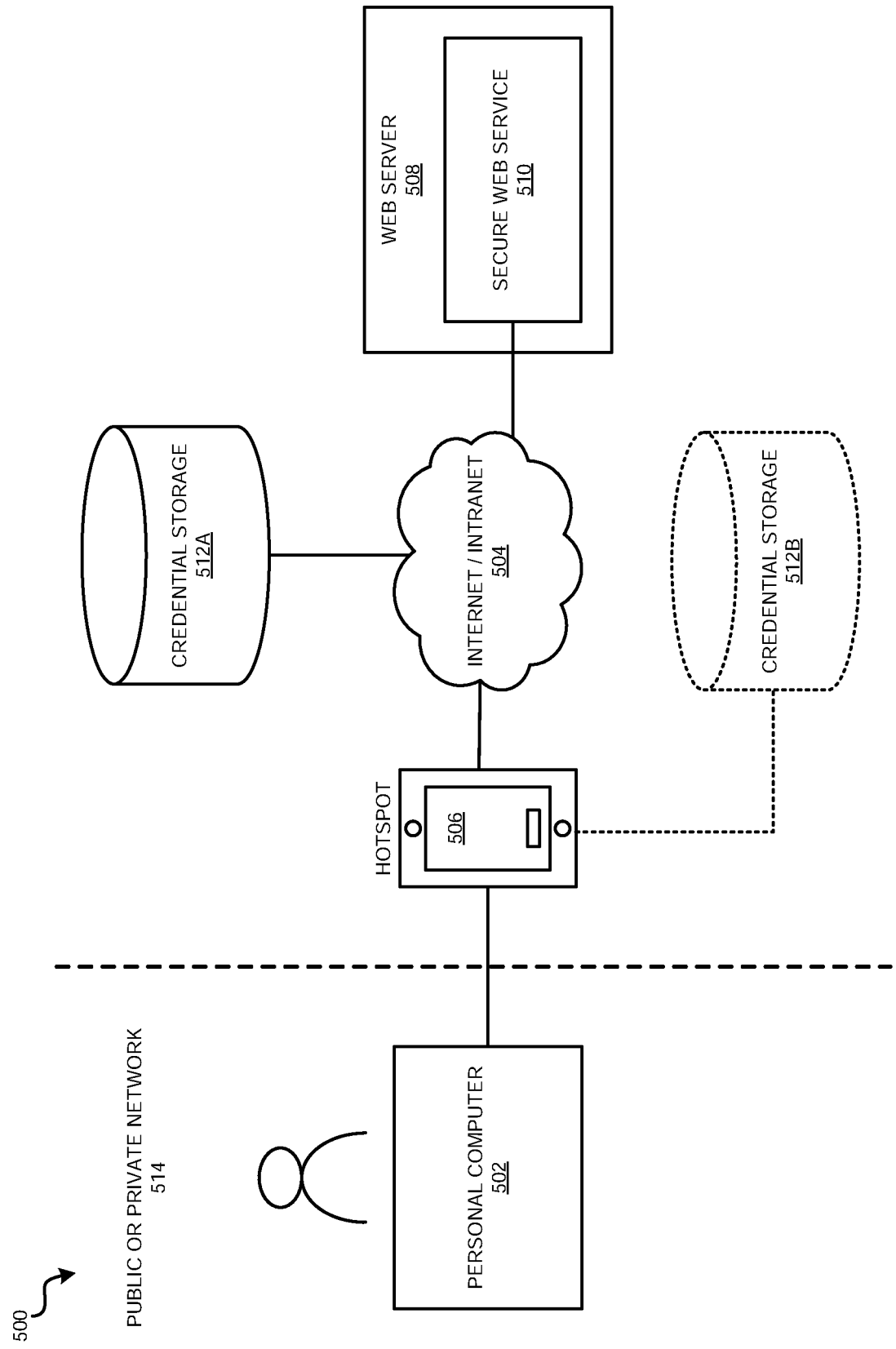
FIG. 5 depicts a block diagram of an alternative example network environment that includes a hotspot device as an intermediary device in accordance with an illustrative embodiment.

With reference to FIG. 5, this figure depicts a block diagram of an alternative example network environment 500 that includes a hotspot device as an intermediary device in accordance with an illustrative embodiment. The example embodiment of FIG. 5 includes a hotspot device 506 as an example of the intermediary device 306 of FIG. 3 and a private computer 502 as an example of the user device 302 of FIG. 3. This embodiment also includes networks 504 and 514 as examples of networks 304 and 314, respectively, of FIG. 3, credential storages 512A and 512B as examples of credential storages 314A and 314B, respectively, of FIG. 3, web server 508 as an example of web server 308 of FIG. 3, and secure web server 510 as an example of secure web server 310 of FIG. 3.

In the illustrated embodiment, the private computer 502 is representative of a computing device for which user is the primary user or owner. For example, the private computer 502 may be a desktop, laptop, or tablet computer that is not available for public use.

In the illustrated embodiment, the hotspot device 506 is a wireless access point that provides network access via a short-range wireless connection, such as Bluetooth, 802.11, and/or wireless local area network (WLAN) technology. In particular, the hotspot device 506 provides wireless network access to the private computer 502. In some embodiments, the hotspot device 506 is a dedicated hotspot device, a mobile telephone with hotspot functionality, or any other computing device having hotspot functionality. In some embodiments, the hotspot 506 connects the private computer 502 to the network 504 using cellular communications (e.g., 3G, 4G, GSM, CDMA, 5G, etc.).

In some embodiments, the hotspot device 506 is a personal hotspot owned or otherwise associated with the user operating the private computer 502. In some such embodiments, the hotspot device 506 is connected to the credential storage 512A, which is geographically and topologically remote from the hotspot device 506. For example, in some embodiments, the credential storage 512A is hosted at a remote data center or corporate server farm.

In alternative embodiments, the hotspot device 506 is instead connected to local credential storage 512B, which is topologically, and possibly also geographically, local to the hotspot device 506. For example, in some embodiments, the credential storage 512B is stored on a database server on a same LAN or WAN as the hotspot device 506, but is geographically distant (e.g., located in a different state, province, territory, or country). In alternative embodiments, the credential storage 512B is stored on a database server on a same LAN or WAN as the hotspot device 506, and is geographically local (e.g., located in a same data center, office, city, etc.) to the hotspot device 506. In other alternative embodiments, the credential storage 512B is stored in memory on the hotspot device 506.

In the illustrated embodiment, despite the use of the private computer 502 instead of a public computer 402 of FIG. 4, the private computer 502 and the wireless connection between the private computer 502 and the hotspot device 506 are still vulnerable points in the communications link between the user and the secure web service 510. For example, the private computer 502 may still have been compromised unbeknownst to the user. Also, if the user is in a public location such as an airport or hotel lobby, an unauthorized third party may be observing the user's activities on the private computer in an attempt to learn the user's login credentials. This represents a risk to the user if the user inputs login credentials using the private computer 502 in order to establish an authenticated session with the secure web service 510.

In the illustrated embodiment, the hotspot device 506 obviates that risk by providing remote authentication processing on behalf of the user in place of the private computer 502. When the user initiates a connection to the secure web service 510, for example by entering a URL associated with the secure web service 510 in a web browser on the private computer 502, the private computer 502 attempts to establish an initial connection with the web server 508, for example using a TCP 3-way handshake process.

In order to allow the user to gain access to the secure elements of the secure web service 510, the web server 508 issues an authentication request addressed to the private computer 502. The hotspot device 506 detects and intercepts the authentication request in order to perform the authentication process on behalf of the private computer 502. The hotspot device 506 transmits a credential request to the credential storage 512A or 512B. In some embodiments, the credential request includes a request for a credential associated with the user and the secure web service 510. The credential storage 512A or 512B locates the requested credentials in response to the request and transmits the credentials to the hotspot device 506. Upon receiving the credentials from the credential storage 512A or 512B, the hotspot device 506 transmits a response to the authentication request with the user's credentials received from the credential storage 512A or 512B. The secure web service 510 validates the credentials and transmits an authentication response addressed to the private computer 502 in order to establish an authenticated session for the user with the secure web service 510. This time, the hotspot device 506 propagates the authentication response to the private computer 502. Thus, the user is able to establish an authenticated session with the secure web service 510 without needing to input or transmit sensitive login credentials using the private computer 502 or the wireless connection between the private computer 502 and the hotspot device 506.

Figure 6:
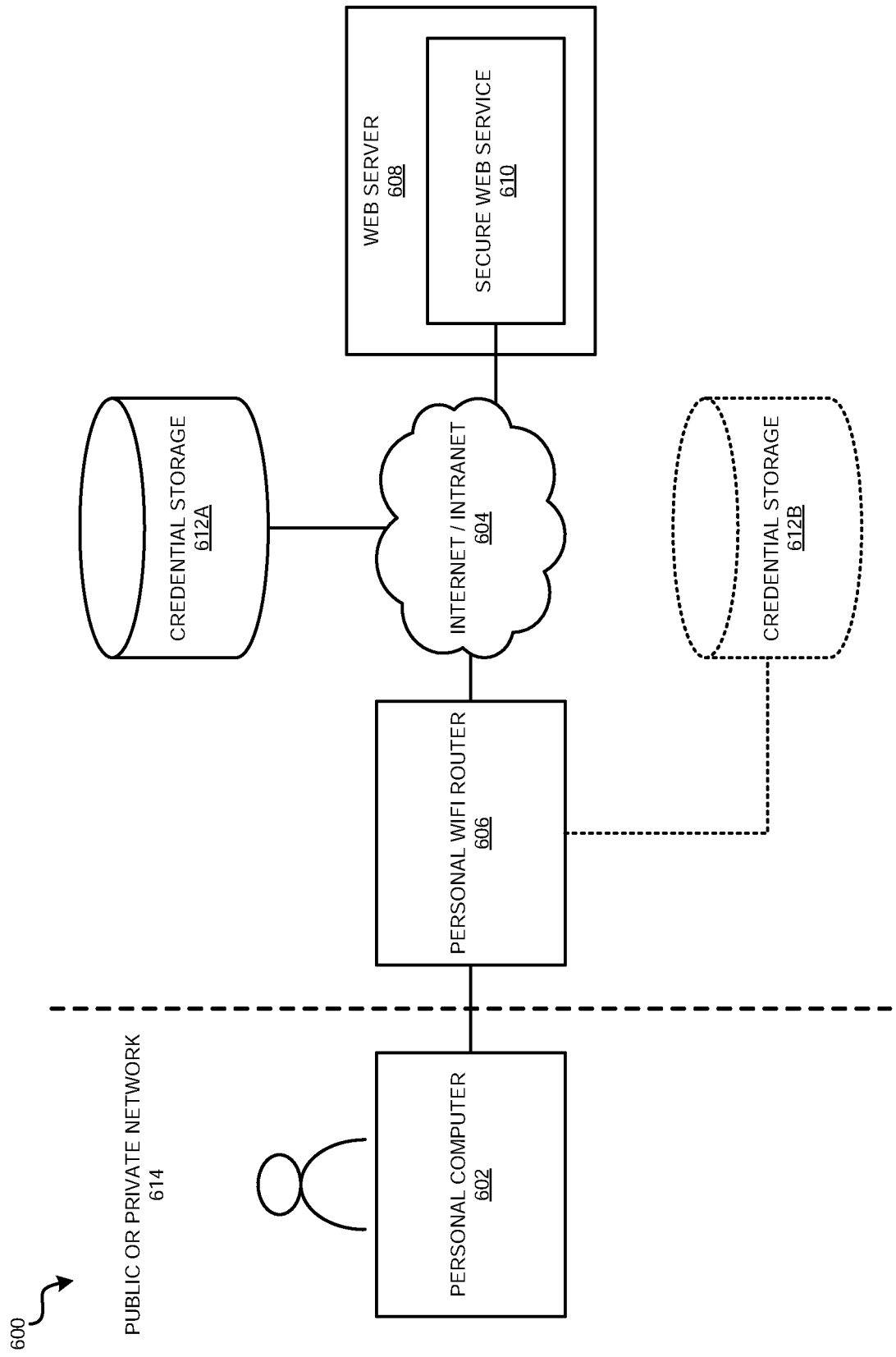
FIG. 6 depicts a block diagram of an example network environment that includes a personal WIFI router as an intermediary device in accordance with an illustrative embodiment.

With reference to FIG. 6, this figure depicts a block diagram of an example network environment 600 that includes a personal WIFI router as an intermediary device in accordance with an illustrative embodiment. The example embodiment of FIG. 6 includes a personal WIFI router 606 as an example of the intermediary device 306 of FIG. 3 and a personal computer 602 as an example of the user device 302 of FIG. 3. This embodiment also includes networks 604 and 614 as examples of networks 304 and 314, respectively, of FIG. 3, credential storages 612A and 612B as examples of credential storages 314A and 314B, respectively, of FIG. 3, web server 608 as an example of web server 308 of FIG. 3, and secure web server 610 as an example of secure web server 310 of FIG. 3.

In the illustrated embodiment, the personal computer 602 is representative of a computing device owned by the user. For example, the personal computer 602 may be a desktop, laptop, smart phone, or tablet computer that is not available for public use.

In the illustrated embodiment, the personal WIFI router 606 is a wireless router that provides network access via a short-range wireless 802.11 technology. In particular, the personal WIFI router 606 provides wireless network access to the personal computer 602.

In some embodiments, the personal WIFI router 606 is owned or otherwise associated with the user operating the personal computer 602. In some such embodiments, the personal WIFI router 606 is connected to the credential storage 612A, which is geographically and topologically remote from the personal WIFI router 606. For example, in some embodiments, the credential storage 612A is hosted at a remote data center or corporate server farm.

In alternative embodiments, the personal WIFI router 606 is instead connected to local credential storage 612B, which is topologically, and possibly also geographically, local to the personal WIFI router 606. For example, in some embodiments, the credential storage 612B is stored on a database server on a same LAN or WAN as the personal WIFI router 606, but is geographically distant (e.g., located in a different state, province, territory, or country). In alternative embodiments, the credential storage 612B is stored on a database server on a same LAN or WAN as the personal WIFI router 606, and is geographically local (e.g., located in a same data center, office, city, etc.) to the personal WIFI router 606. In other alternative embodiments, the credential storage 612B is stored in memory on the personal WIFI router 606.

In the illustrated embodiment, despite the use of the personal computer 602 instead of a public computer 402 of FIG. 4, the personal computer 602 and the wireless connection between the personal computer 602 and the personal WIFI router 606 are still vulnerable points in the communications link between the user and the secure web service 610. For example, the personal computer 602 may still have been compromised unbeknownst to the user. Also, if the user is in a public location such as an airport or hotel lobby, an unauthorized third party may be observing the user's activities on the personal computer in an attempt to learn the user's login credentials. This represents a risk to the user if the user inputs login credentials using the personal computer 602 in order to establish an authenticated session with the secure web service 610.

In the illustrated embodiment, the personal WIFI router 606 obviates that risk by providing remote authentication processing on behalf of the user in place of the personal computer 602. When the user initiates a connection to the secure web service 610, for example by entering a URL associated with the secure web service 610 in a web browser on the personal computer 602, the personal computer 602 attempts to establish an initial connection with the web server 608, for example using a TCP 3-way handshake process.

In order to allow the user to gain access to the secure elements of the secure web service 610, the web server 608 issues an authentication request addressed to the personal computer 602. The personal WIFI router 606 detects and intercepts the authentication request in order to perform the authentication process on behalf of the personal computer 602. The personal WIFI router 606 transmits a credential request to the credential storage 612A or 612B. In some embodiments, the credential request includes a request for a credential associated with the user and the secure web service 610. The credential storage 612A or 612B locates the requested credentials in response to the request and transmits the credentials to the personal WIFI router 606. Upon receiving the credentials from the credential storage 612A or 612B, the personal WIFI router 606 transmits a response to the authentication request with the user's credentials received from the credential storage 612A or 612B. The secure web service 610 validates the credentials and transmits an authentication response addressed to the personal computer 602 in order to establish an authenticated session for the user with the secure web service 610. This time, the personal WIFI router 606 propagates the authentication response to the personal computer 602. Thus, the user is able to establish an authenticated session with the secure web service 610 without needing to input or transmit sensitive login credentials using the personal computer 602 or the wireless connection between the personal computer 602 and the personal WIFI router 606.

Figure 7:
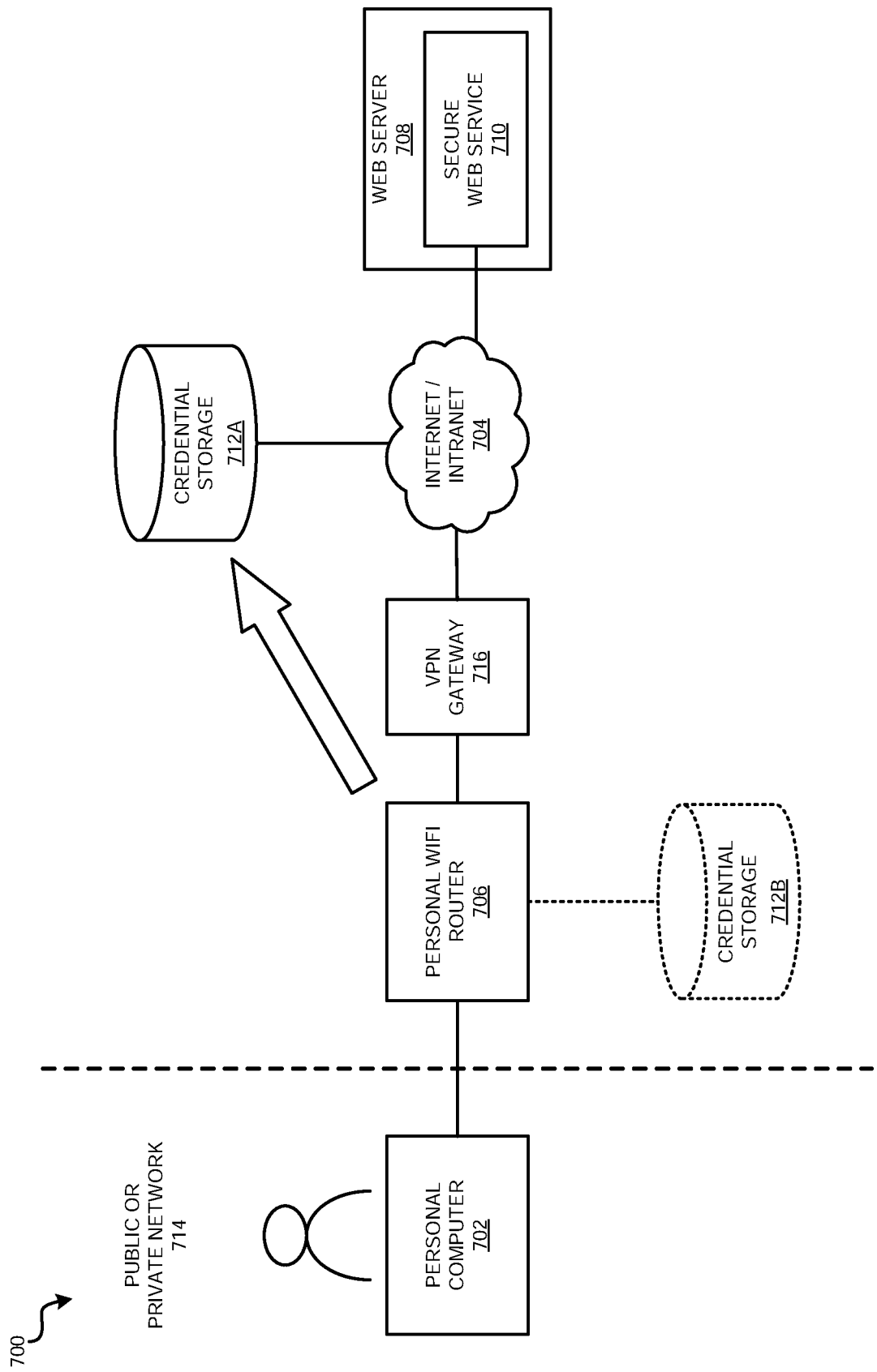
FIG. 7 depicts a block diagram of an alternative example network environment that includes a personal WIFI router as an intermediary device in accordance with an illustrative embodiment.

With reference to FIG. 7, this figure depicts a block diagram of an alternative example network environment 700 that includes a personal WIFI router as an intermediary device in accordance with an illustrative embodiment. The example embodiment of FIG. 7 includes a personal WIFI router 706 as an example of the intermediary device 306 of FIG. 3 and a personal computer 702 as an example of the user device 302 of FIG. 3. This embodiment also includes networks 704 and 714 as examples of networks 304 and 314, respectively, of FIG. 3, credential storages 712A and 712B as examples of credential storages 314A and 314B, respectively, of FIG. 3, web server 708 as an example of web server 308 of FIG. 3, and secure web server 710 as an example of secure web server 310 of FIG. 3.

The illustrated embodiment is similar to that of FIG. 6, except that the network environment 700 further includes a VPN gateway 716 topologically located between the personal WIFI router 706 and the web server 708, and also between the personal WIFI router 706 and the credential storage 712A. Upon request by the user or by the personal WIFI router 706, the VPN gateway 716 establishes a VPN tunnel between the personal WIFI router 706 and one or both of the credential storage 712A and the web server 708. The VPN tunnel encrypts the data being transmitted between the personal WIFI router 706 and one or both of the credential storage 712A and the web server 708, thereby adding an extra layer of security to the network paths along which the user's authentication credential will travel.

Figure 8:
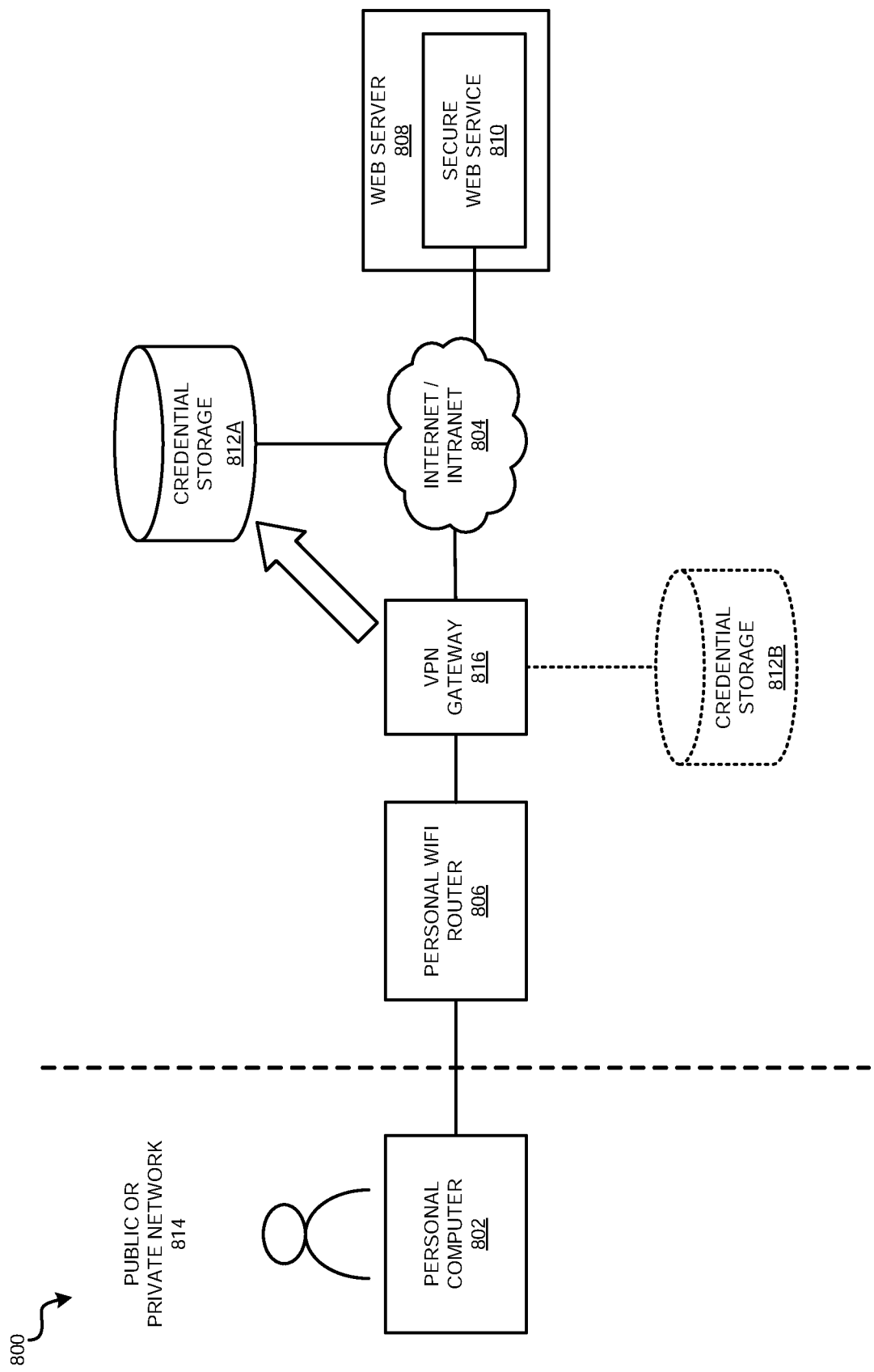
FIG. 8 depicts a block diagram of an example network environment that includes a VPN gateway as an intermediary device in accordance with an illustrative embodiment.

With reference to FIG. 8, this figure depicts a block diagram of an example network environment 800 that includes a VPN gateway as an intermediary device in accordance with an illustrative embodiment. The example embodiment of FIG. 8 includes a VPN gateway 816 as an example of the intermediary device 306 of FIG. 3 and a personal computer 802 as an example of the user device 302 of FIG. 3. This embodiment also includes networks 804 and 814 as examples of networks 304 and 314, respectively, of FIG. 3, credential storages 812A and 812B as examples of credential storages 314A and 314B, respectively, of FIG. 3, web server 808 as an example of web server 308 of FIG. 3, and secure web server 810 as an example of secure web server 310 of FIG. 3.

The illustrated embodiment is similar to that of FIG. 7, except that the VPN gateway 816 acts as the intermediary device instead of the personal WIFI router 806. The VPN gateway 816 still provides VPN services, such as establishing a VPN tunnel between the personal WIFI router 806 and the web server 808.

In the illustrated embodiment, the VPN gateway 816 is connected to the credential storage 812A, which is geographically and topologically remote from the VPN gateway 816. For example, in some embodiments, the credential storage 812A is hosted at a remote data center or corporate server farm.

In alternative embodiments, the VPN gateway 816 is instead connected to local credential storage 812B, which is topologically, and possibly also geographically, local to the VPN gateway 816. For example, in some embodiments, the credential storage 812B is stored on a database server on a same LAN or WAN as the VPN gateway 816, but is geographically distant (e.g., located in a different state, province, territory, or country). In alternative embodiments, the credential storage 812B is stored on a database server on a same LAN or WAN as the VPN gateway 816, and is geographically local (e.g., located in a same data center, office, city, etc.) to the VPN gateway 816. In other alternative embodiments, the credential storage 812B is stored in memory on the VPN gateway 816.

In the illustrated embodiment, the VPN gateway 816 obviates that risk associated with the user providing authentication or login credential using the personal computer 802. The VPN gateway 816 accomplishes this by providing remote authentication processing on behalf of the user in place of the personal computer 802. When the user initiates a connection to the secure web service 810, for example by entering a URL associated with the secure web service 810 in a web browser on the personal computer 802, the personal computer 802 attempts to establish an initial connection with the web server 808, for example using a TCP 3-way handshake process.

In order to allow the user to gain access to the secure elements of the secure web service 810, the web server 808 issues an authentication request addressed to the personal computer 802. The VPN gateway 816 detects and intercepts the authentication request in order to perform the authentication process on behalf of the personal computer 802. The VPN gateway 816 transmits a credential request to the credential storage 812A or 812B. In some embodiments, the credential request includes a request for a credential associated with the user and the secure web service 810. The credential storage 812A or 812B locates the requested credentials in response to the request and transmits the credentials to the VPN gateway 816. Upon receiving the credentials from the credential storage 812A or 812B, the VPN gateway 816 transmits a response to the authentication request with the user's credentials received from the credential storage 812A or 812B. The secure web service 810 validates the credentials and transmits an authentication response addressed to the personal computer 802 in order to establish an authenticated session for the user with the secure web service 810. This time, the VPN gateway 816 propagates the authentication response to the personal computer 802. Thus, the user is able to establish an authenticated session with the secure web service 810 without needing to input or transmit sensitive login credentials using the personal computer 802 or the wireless connection between the personal computer 802 and the VPN gateway 816.

Figure 9:
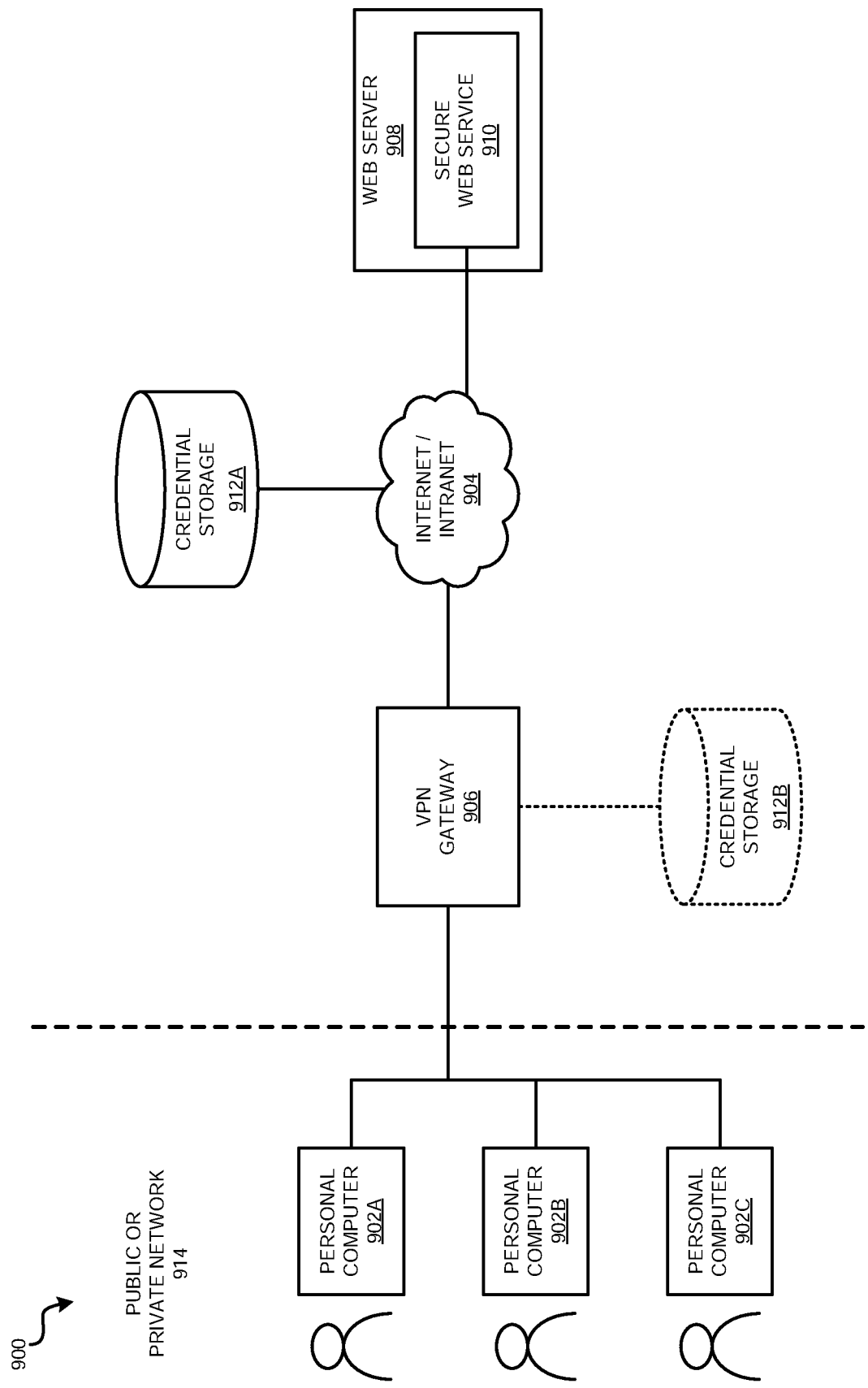
FIG. 9 depicts a block diagram of an example multi-user or corporate network environment that includes a VPN gateway as an intermediary device in accordance with an illustrative embodiment.

With reference to FIG. 9, this figure depicts a block diagram of an example multi-user or corporate network environment 900 that includes a VPN gateway as an intermediary device in accordance with an illustrative embodiment. The example embodiment of FIG. 9 includes a VPN gateway 906 as an example of the intermediary device 306 of FIG. 3 and a plurality of personal computers 902A-902C as examples of the user device 302 of FIG. 3. This embodiment also includes networks 904 and 914 as examples of networks 304 and 314, respectively, of FIG. 3, credential storages 912A and 912B as examples of credential storages 314A and 314B, respectively, of FIG. 3, web server 908 as an example of web server 308 of FIG. 3, and secure web server 910 as an example of secure web server 310 of FIG. 3.

The illustrated embodiment is similar to that of FIG. 8, except that the network environment 900 excludes the WIFI router and the VPN gateway 906 acts as an intermediary device for a plurality of users instead of for a single user. The VPN gateway 906 also provides VPN services for multiple users instead of for a single user, such as establishing respective VPN tunnels between the web server 908 and each of the personal computers 902A-902C.

In the illustrated embodiment, while three users and personal computers 902A-902C are shown, actual implementations may include any number of users and personal computers. The VPN gateway 906 is connected to one or both of the credential storages 912A and 912B. In some embodiments, all of the users' credentials may be stored on only one of the credential storages 912A and 912B. In alternative embodiments, some users' credential may be stored on credential storage 912A and other users' credentials are stored on credential storage 912B. In some embodiments, all of the users' credentials may be stored on both of the credential storages 912A and 912B, which allows for the availability of a backup credential storage if the other becomes unavailable for any reason.

In the illustrated embodiment, the VPN gateway 906 obviates that risk associated with the users providing authentication or login credentials using the personal computers 902A-902C. The VPN gateway 906 accomplishes this by providing remote authentication processing on behalf of the users in place of the personal computers 902A-902C. When any of the users initiates a connection to the secure web service 910, for example by entering a URL associated with the secure web service 910 in a web browser on the personal computer 902, the personal computer 902A, 902B, or 902C attempts to establish an initial connection with the web server 908, for example using a TCP 3-way handshake process.

The following description refers to the user of personal computer 902A as an example that applies equally to users of personal computers 902B and 902C. In order to allow the user to gain access to the secure elements of the secure web service 910, the web server 908 issues an authentication request addressed to the personal computer 902A. The VPN gateway 906 detects and intercepts the authentication request in order to perform the authentication process on behalf of the personal computer 902A.

In some embodiments, the VPN gateway 906 detects which of the plurality of users is associated with the authentication request using a look-up table that associates users with personal computers. For example, in some such embodiments, the lookup table includes a username associated with a mac address and/or an IP address of the user's personal computer 902A. In alternative embodiments, when a user initiates a network connection through the VPN gateway 906, the user provides a unique token or certificate from the personal computer 902A to the VPN gateway 906 that allows the VPN gateway 906 to identify and associate the user with the personal computer 902A.

Once the VPN gateway 906 has determined which user is associated with the authentication request, the VPN gateway 906 transmits a credential request to the credential storage 912A or 912B for a credential associated with the identified user for the secure web service 910. The credential storage 912A or 912B locates the requested credentials in response to the request and transmits the credentials to the VPN gateway 906. Upon receiving the credentials from the credential storage 912A or 912B, the VPN gateway 906 transmits a response to the authentication request with the user's credentials received from the credential storage 912A or 912B. The secure web service 910 validates the credentials and transmits an authentication response addressed to the personal computer 902A in order to establish an authenticated session for the user with the secure web service 910. This time, the VPN gateway 906 propagates the authentication response to the personal computer 902A. Thus, the user is able to establish an authenticated session with the secure web service 910 without needing to input or transmit sensitive login credentials using the personal computer 902A or the wireless connection between the personal computer 902A and the VPN gateway 906.

Figure 10:
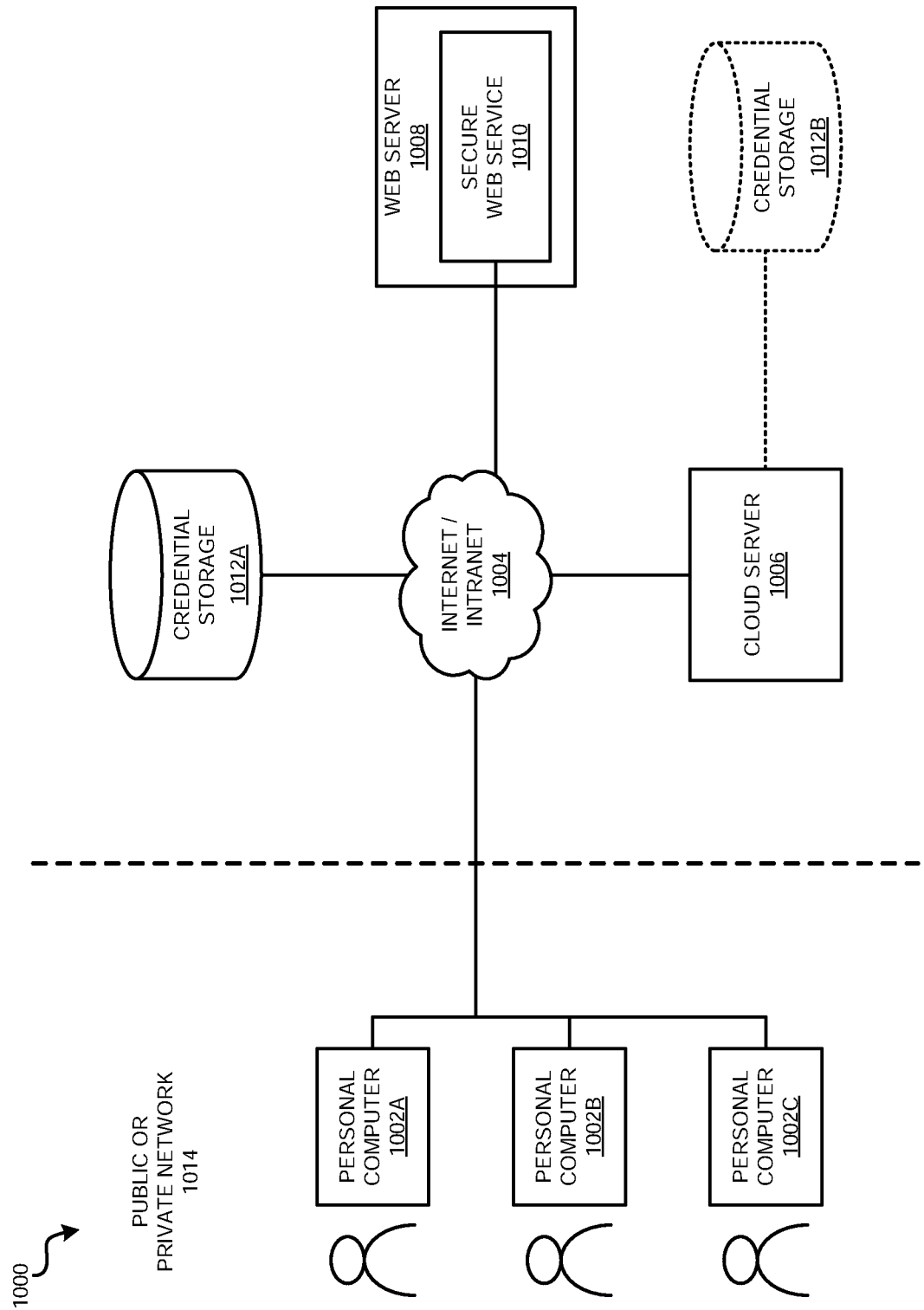
FIG. 10 depicts a block diagram of an example multi-user or corporate network environment that includes a cloud server as an intermediary device in accordance with an illustrative embodiment.

With reference to FIG. 10, this figure depicts a block diagram of an example multi-user or corporate network environment 1000 that includes a cloud server as an intermediary device in accordance with an illustrative embodiment. The example embodiment of FIG. 10 includes a cloud server 1006 as an example of the intermediary device 306 of FIG. 3 and a plurality of personal computers 902A-902C as examples of the user device 302 of FIG. 3. This embodiment also includes networks 1004 and 1014 as examples of networks 304 and 314, respectively, of FIG. 3, credential storages 1012A and 1012B as examples of credential storages 314A and 314B, respectively, of FIG. 3, web server 1008 as an example of web server 308 of FIG. 3, and secure web server 1010 as an example of secure web server 310 of FIG. 3.

The illustrated embodiment is similar to that of FIG. 9, except that the network environment 1000 includes a cloud server 1006 performing processes described herein of the intermediary device instead of a VPN gateway. The use of the cloud server 1006 as the intermediary device providing remote authentication processing for local user devices 1002A-1002C enable convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 11:
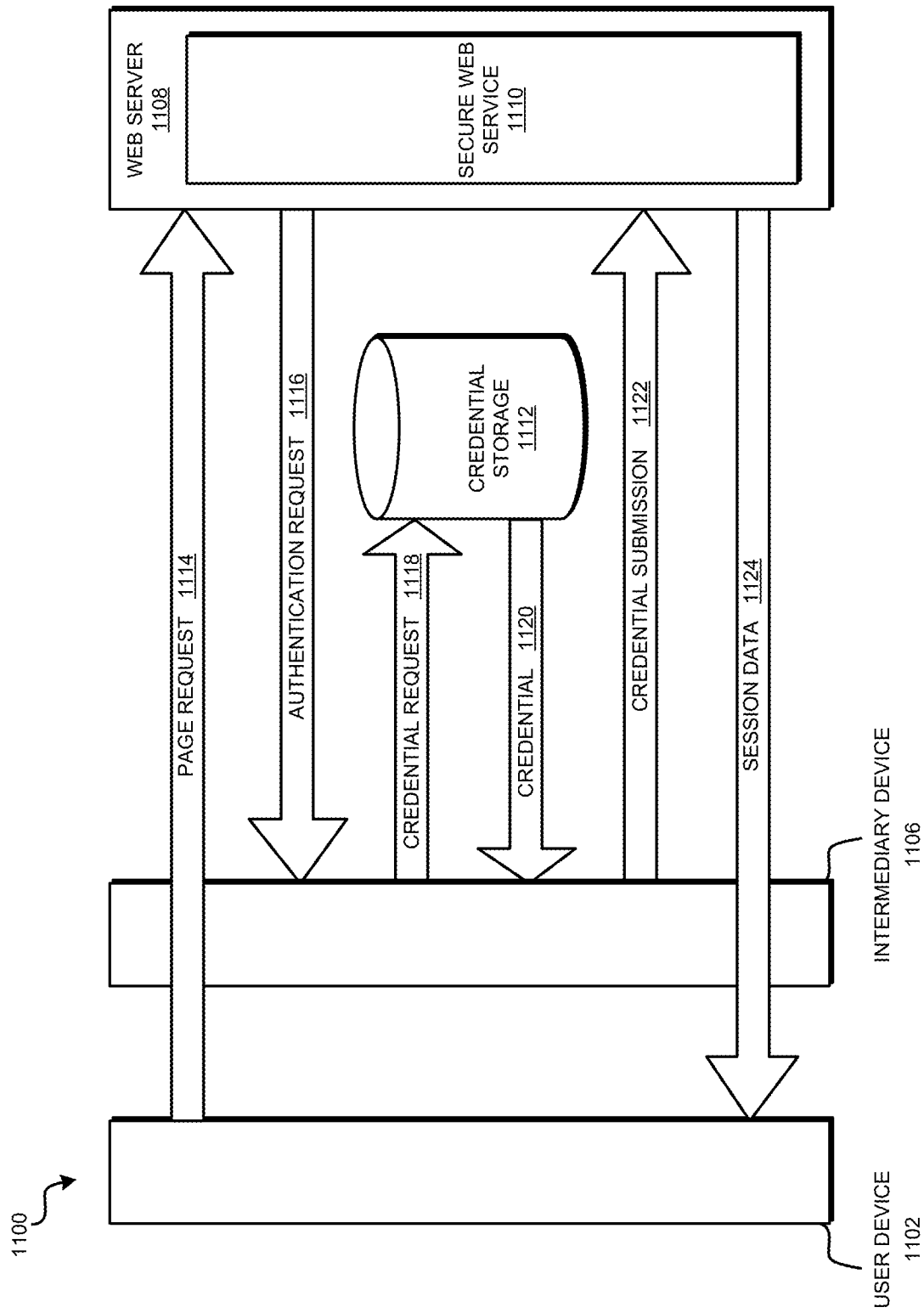
FIG. 11 depicts a timing diagram illustrating example data flows in an example network environment in accordance with one or more example embodiments.

With reference to FIG. 11, this figure depicts a timing diagram illustrating example data flows in an example network environment 1100 in accordance with one or more example embodiments. The example embodiment of FIG. 11 includes an intermediary device 1106 as an example of the intermediary device 306 of FIG. 3 and a user device 1102 as an example of the user device 302 of FIG. 3. This embodiment also includes credential storage 1112 as an example of credential storages 314A and 314B of FIG. 3, web server 1108 as an example of web server 308 of FIG. 3, and secure web server 1110 as an example of secure web server 310 of FIG. 3.

The illustrated embodiment depicts an example scenario in which the user device 1102 initiates a connection to the secure web service 1110 by transmitting a page request 1114 to the web server 1108. For example, the user device 1102 may initiate the connection in response to a user inputting a URL associated with the secure web service 1110 in a web browser on the user device 1102.

In order to allow the user to gain access to the secure elements of the secure web service 1110, the web server 1108 issues an authentication request 1116 addressed to the user device 1102. The intermediary device 1106 detects and intercepts the authentication request 1116 in order to perform the authentication process on behalf of the user device 1102. The intermediary device 1106 transmits a credential request 1118 to the credential storage 1112. In some embodiments, the credential request includes a request for a credential associated with the user and the secure web service 1110. The credential storage 1112 locates the requested credentials in response to the request and transmits the credentials 1120 to the intermediary device 1106. Upon receiving the credentials from the credential storage 1112, the intermediary device 1106 transmits a credential submission 1122 in response to the authentication request with the user's credentials received from the credential storage 1112.

The secure web service 1110 validates the credentials and transmits session data 1124 in an authentication response addressed to the user device 1102 to establish an authenticated session for the user with the secure web service 1110. This time, the intermediary device 1106 propagates the authentication response to the user device 1102. The secure web service 1110 may use any of a variety of known techniques for establishing an authenticated session with the user device 1102. As a non-limiting example, the secure web service 1110 may include session data, such as a certificate, token, or cookie, with the authentication response. The user device 1102 may then use the session data to maintain an authenticated session with the secure web service 1110.

Figure 12:
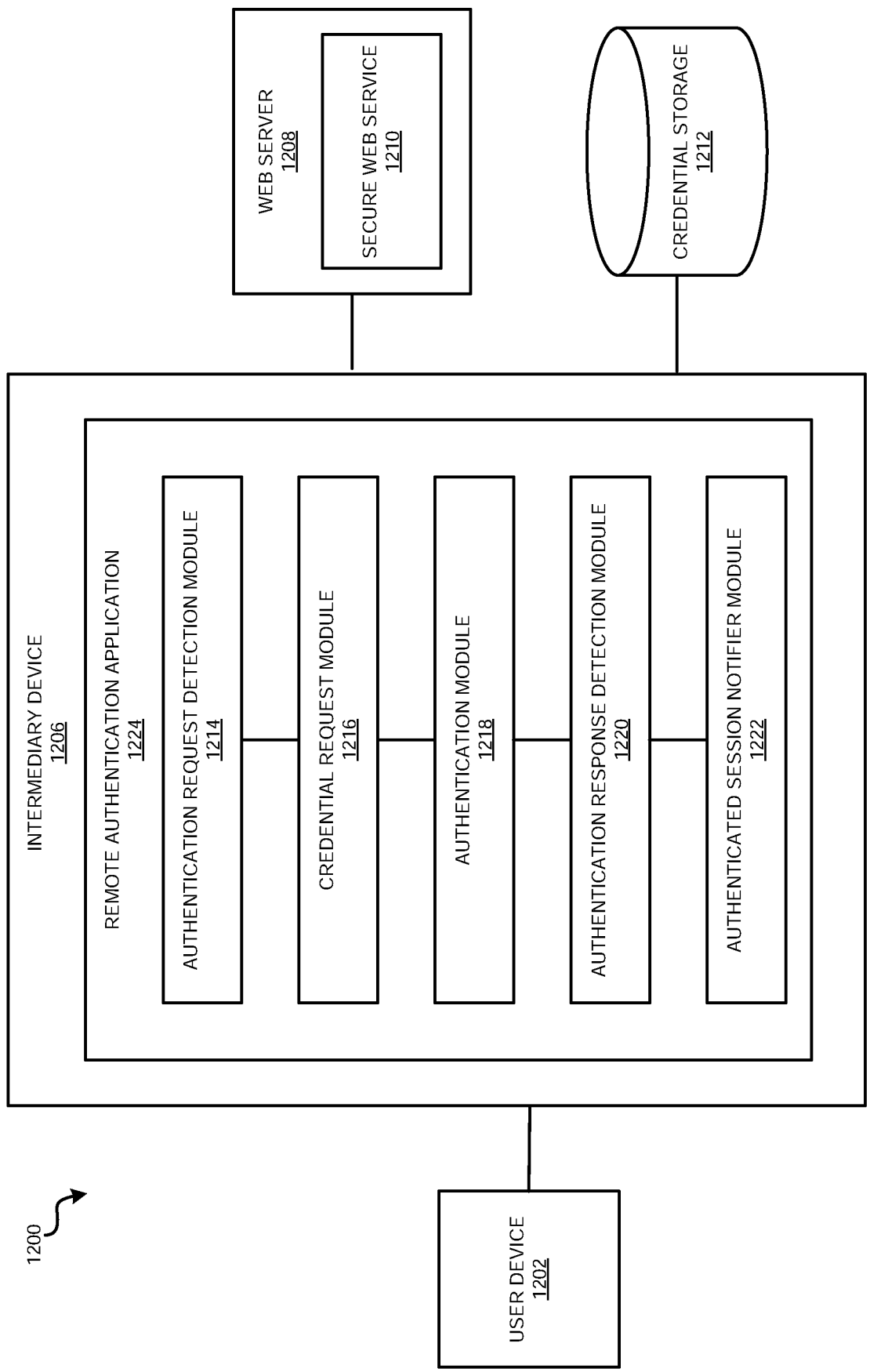
FIG. 12 depicts a block diagram of an example intermediary device in a network environment in accordance with one or more example embodiments.

With reference to FIG. 12, this figure depicts a block diagram of an example intermediary device 1206 in a network environment 1200 in accordance with one or more example embodiments. In some embodiments, the intermediary device 1206 is an example of the intermediary device 306 of FIG. 3, the user device 1202 is an example of the user device 302 of FIG. 3, the credential storage 1212 is an example of credential storages 314A and 314B of FIG. 3, web server 1208 as an example of web server 308 of FIG. 3, and secure web server 1110 as an example of secure web server 310 of FIG. 3.

In the illustrated embodiment, the intermediary device 1206 comprises a remote authentication application 1224. In a particular embodiment, the remote authentication application 1224 is an example of application 105A of processing system 104 and application 105B of server 106 of FIG. 1. In a particular embodiment, the remote authentication application 1224 provides remote authentication processing for remote authentication of a user device 1202 to a secure web service 1210.

In the illustrated embodiment, the remote authentication application 1224 includes an authentication request detection module 1214, a credential request module 1216, an authentication module 1218, an authentication response detection module 1220, and an authenticated session notifier module 1222. In alternative embodiments, the remote authentication application 1224 includes some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the user device 1202 initiates a connection to the secure web service 1210 by transmitting a page request to the web server 1208. For example, the user device 1202 may initiate the connection in response to a user inputting a URL associated with the secure web service 1210 in a web browser on the user device 1202.

In order to allow the user to gain access to the secure elements of the secure web service 1210, the web server 1208 issues an authentication request addressed to the user device 1202. The authentication request detection module 1214 detects and intercepts the authentication request in order to perform the authentication process on behalf of the user device 1202. For example, in some embodiments, the authentication request detection module 1214 monitors network traffic directed to the user device 1202 and performs pattern matching on request headers, for example to detect an HTTP 401 unauthorized status line and a WWW-Authenticate header field.

Upon detecting an authentication request, the authentication request detection module 1214 notifies the credential request module 1216 that an authentication request has been intercepted and provides relevant data from the request, such as information for identifying the secure web service 1210 and information for identifying the user or user device 1202. In response, the credential request module 1216 transmits a credential request to the credential storage 1212. In some embodiments, the credential request includes information for identifying the secure web service 1210 and information for identifying the user or user device 1202. The credential storage 1212 locates the requested credentials in response to the request and transmits the credentials to the credential request module 1216.

Upon receiving the requested credentials from the credential storage 1212, the credential request module 1216 notifies the authentication module 1218 about the authentication request. The credential request module 1216 provides the credential received from the credential storage 1212 to the authentication module 1218. In response to receiving the credentials, the authentication module 1218 transmits a credential submission in response to the authentication request with the user's credentials received from the credential storage 1212. The authentication module 1218 also notifies the 1220 about the authentication request.

Upon being notified by the authentication module 1218 regarding the authentication request, the authentication response detection module 1220 begins monitoring network traffic addressed to the user device 1202 for a response from the secure web service 1210 to the credential submission. The secure web service 1210 validates the credentials and transmits session data in an authentication response addressed to the user device 1202 to establish an authenticated session for the user with the secure web service 1210. In some embodiments, the authentication response detection module 1220 monitors network traffic directed to the user device 1202 and performs pattern matching on response headers, for example to detect an HTTP 200 OK response with a Set-Cookie header.

Upon detecting the authentication response, the authentication response detection module 1220 notifies the authenticated session notifier module 1222 about the authentication request and the response received from the secure web service 1210. The authenticated session notifier module 1222 then propagates the response to the user device 1202. From that point, the user device 1202 may use the session data to maintain an authenticated session with the secure web service 1210.

Figure 13:
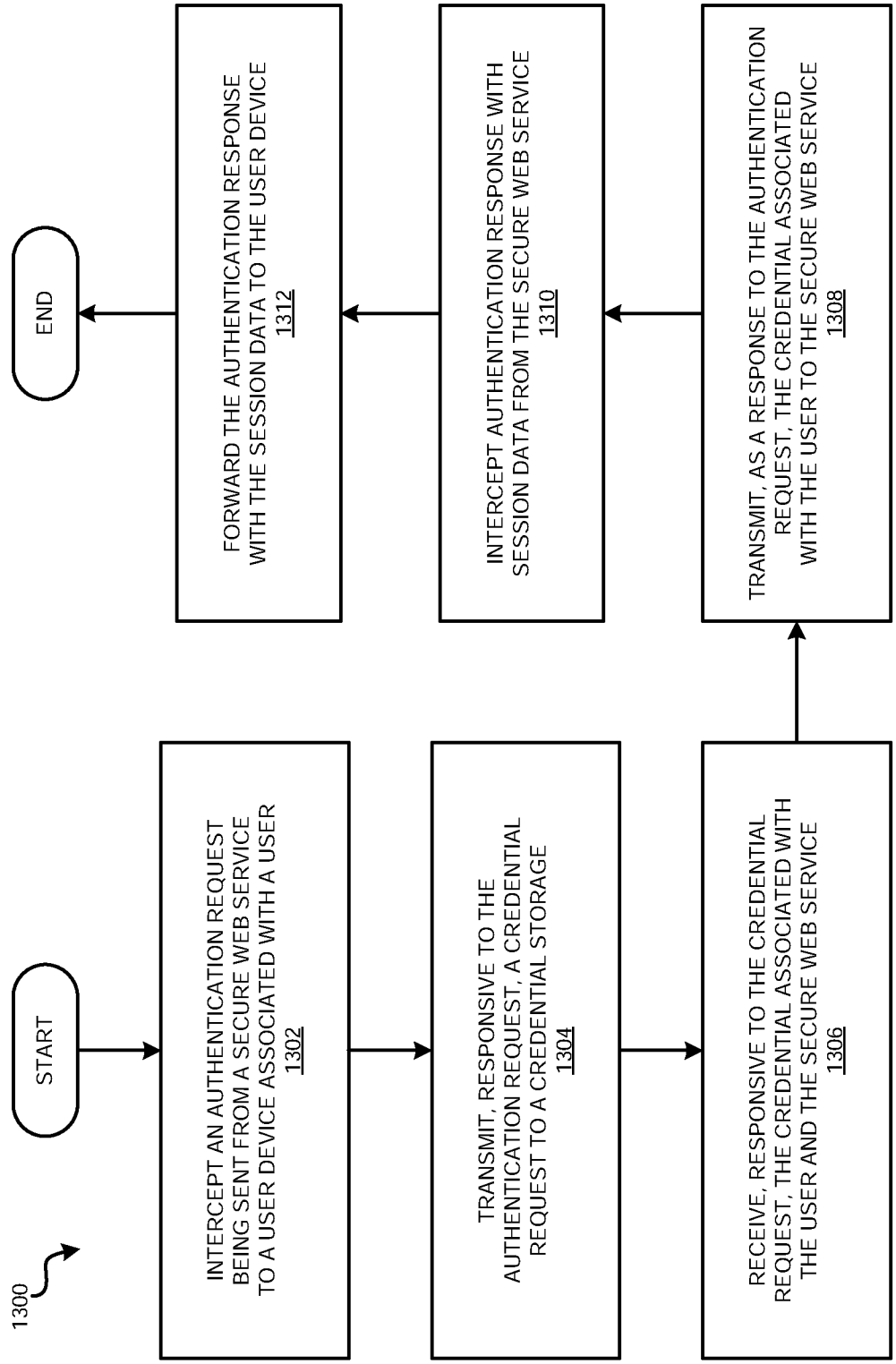
FIG. 13 depicts a flowchart of an example process for remote authentication for a user device in accordance with an illustrative embodiment.

With reference to FIG. 13, this figure depicts a flowchart of an example process 1300 for remote authentication for a user device in accordance with an illustrative embodiment. In a particular embodiment, embodiments of the intermediary device 306 carry out the process 1300.

In the illustrated embodiment, a user device has initiated a connection to a secure web service by transmitting a page request to the web server. For example, the user device may initiate the connection in response to a user inputting a URL associated with the secure web service in a web browser on the user device. In order to allow the user to gain access to the secure elements of the secure web service, the web server issues an authentication request addressed to the user device.

At block 1302, the process intercepts an authentication request being sent from the secure web service to the user device. The process detects and intercepts the authentication request in order to perform the authentication process on behalf of the user device. For example, in some embodiments, process monitors network traffic directed to the user device and performs pattern matching on request headers, for example to detect an HTTP 401 unauthorized status line and a WWW-Authenticate header field.

Next, at block 1304, upon detecting an authentication request, the process transmits, responsive to the authentication request, a credential request to a credential storage. In some embodiments, the credential request includes a request for a credential associated with the user and the secure web service. The credential storage locates the requested credentials in response to the request and transmits the credentials to the credential request module.

Next, at block 1306, the process receives, responsive to the credential request, the credential associated with the user and the secure web service from the credential storage. Then, at block 1308, the process transmits, as a response to the authentication request, the credential associated with the user to the secure web service.

Next, at block 1310, the process intercepts, responsive to successful validation of the credential by the secure web service, an authentication response from the secure web service. In some such embodiments, the authentication response includes session data required for the user device to be able to maintain an authenticated session with the secure web service. In some embodiments, the process intercepts the authentication response by monitoring network traffic addressed to the user device for a response from the secure web service to the credential submission. In some embodiments, the secure web service validates the credentials and transmits session data in an authentication response addressed to the user device in order to establish an authenticated session for the user with the secure web service. In some embodiments, the authentication response detection module monitors network traffic directed to the user device and performs pattern matching on response headers, for example to detect an HTTP 200 OK response with a Set-Cookie header.

Next, at block 1310, the process forwards the authentication response with the session data to the user device. In some such embodiments, from that point forward, the user device may use the session data to maintain an authenticated session with the secure web service.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   establishing, by a wireless router, a wireless network connection with a user device and a second user device;
   intercepting, at an intermediary device, an authentication request being sent from a secure web service to the user device associated with a user and a second authentication request being sent from the secure web service to the second user device associated with a second user, wherein the intercepting of the authentication request comprises dropping, by the wireless router, the authentication request before the authentication request arrives at the user device;
   transmitting from the intermediary device, responsive to the second authentication request, a credential request to a credential storage, wherein the credential request includes a request for a credential associated with the second user and the secure web service;
   receiving, at the intermediary device, responsive to the credential request, the credential associated with the second user and the secure web service;
   transmitting from the intermediary device, as a response to the authentication request, the credential associated with the second user to the secure web service;
   intercepting, responsive to successful validation of the credential by the secure web service, an authentication response from the secure web service, wherein the authentication response includes session data required for maintaining an authenticated session with the secure web service; and
   forwarding the authentication response with the session data to the second user device.

2. The computer implemented method of claim 1, wherein the transmitting of the credential request comprises:
   establishing, by the wireless router, a secure network connection with a database server hosting the credential storage.

3. The computer implemented method of claim 1, further comprising:
   constructing, prior to the intercepting of the authentication request, the credential storage in a memory of the wireless router.

4. The computer implemented method of claim 3, wherein the transmitting of the credential request comprises:
   transmitting the credential request across an internal bus of the wireless router to the memory of the wireless router.

5. The computer implemented method of claim 1, further comprising:
   establishing, by a virtual private network (VPN) gateway, a VPN tunnel between the user device and a server hosting the secure web service, and a second VPN tunnel between the second user device and the server hosting the secure web service.

6. The computer implemented method of claim 5, wherein the intercepting of the authentication request comprises dropping, by the VPN gateway, the authentication request before it arrives at the user device.

7. The computer implemented method of claim 5, wherein the transmitting of the credential request comprises:
   establishing, by the VPN gateway, a secure network connection with a database server hosting the credential storage.

8. The computer implemented method of claim 5, further comprising:
   constructing, prior to the intercepting of the authentication request, the credential storage in a memory of the VPN gateway.

9. The computer implemented method of claim 8, wherein the transmitting of the credential request comprises:
   transmitting the credential request across an internal bus of the VPN gateway to the memory of the VPN gateway.

10. A computer usable program product for summarizing mixed media conversations in a messaging application, the computer program product comprising one or more computer readable storage media, and program instructions collectively stored on the one or more computer readable storage media, the program instructions executable by a processor to cause the processor to perform operations comprising:
    establishing, by a wireless router, a wireless network connection with a user device and a second user device;
    intercepting, at an intermediary device, an authentication request being sent from a secure web service to the user device associated with a user and a second authentication request being sent from the secure web service to the second user device associated with a second user, wherein the intercepting of the authentication request comprises dropping, by the wireless router, the authentication request before the authentication request arrives at the user device;
transmitting from the intermediary device, responsive to the second authentication request, a credential request to a credential storage, wherein the credential request includes a request for a credential associated with the second user and the secure web service;
receiving, at the intermediary device, responsive to the credential request, the credential associated with the second user and the secure web service;
transmitting from the intermediary device, as a response to the authentication request, the credential associated with the second user to the secure web service;
intercepting, responsive to successful validation of the credential by the secure web service, an authentication response from the secure web service, wherein the authentication response includes session data required for maintaining an authenticated session with the secure web service; and
forwarding the authentication response with the session data to the second user device.

11. The computer usable program product of claim 10, wherein the stored program instructions are stored in a computer readable storage device in a data processing system, and wherein the stored program instructions are transferred over a network from a remote data processing system.

12. The computer usable program product of claim 10, wherein the stored program instructions are stored in a computer readable storage device in a server data processing system, and wherein the stored program instructions are downloaded over a network to a remote data processing system for use in a computer readable storage device associated with the remote data processing system, further comprising:
program instructions to meter use of the computer usable code associated with the request; and
program instructions to generate an invoice based on the metered use.

13. A computer usable program product of claim 10, further comprising:
constructing, prior to the intercepting of the authentication request, the credential storage in a memory of the wireless router.

14. A computer usable program product of claim 10, further comprising:
establishing, by a virtual private network (VPN) gateway, a VPN tunnel between the user device and a server hosting the secure web service, and a second VPN tunnel between the second user device and the server hosting the secure web service.

15. A computer system comprising a processor and one or more computer readable storage media, and program instructions collectively stored on the one or more computer readable storage media, the program instructions executable by the processor to cause the processor to perform operations comprising:
establishing, by a virtual private network (VPN) gateway, a VPN tunnel between a user device and a server hosting the secure web service, and a second VPN tunnel between a second user device and the server hosting the secure web service;
intercepting, at an intermediary device, an authentication request being sent from a secure web service to the user device associated with a user and a second authentication request being sent from the secure web service to the second user device associated with a second user, wherein the intercepting of the authentication request comprises dropping, by the VPN gateway, the authentication request before the authentication request arrives at the user device;
transmitting from the intermediary device, responsive to the second authentication request, a credential request to a credential storage, wherein the credential request includes a request for a credential associated with the second user and the secure web service;
receiving, at the intermediary device, responsive to the credential request, the credential associated with the second user and the secure web service;
transmitting from the intermediary device, as a response to the authentication request, the credential associated with the second user to the secure web service;
intercepting, responsive to successful validation of the credential by the secure web service, an authentication response from the secure web service, wherein the authentication response includes session data required for maintaining an authenticated session with the secure web service; and
forwarding the authentication response with the session data to the second user device.

16. The computer system of claim 15, further comprising:
establishing, by a wireless router, a wireless network connection with the user device.

17. The computer system of claim 16, wherein the intercepting of the authentication request comprises dropping, by the wireless router, the authentication request before the authentication request arrives at the user device.

* * * * *